(12) United States Patent
Manning (10) Patent No.: US 7,782,274 B2
(45) Date of Patent: Aug. 24, 2010

(54) FOLDING MULTIMEDIA DISPLAY DEVICE (75) Inventor: Gregory P. Manning, New York, NY (US)

(73) Assignee: CFPH, LLC, New York, NY (US)

( * ) Notice: Subject to any disclaimer, the term of this patent is extended or adjusted under 35 U.S.C. 154(b) by 1006 days.

(21) Appl. No.: 11/423,175

(22) Filed: Jun. 9, 2006

(65) Prior Publication Data

US 2007/0285341 A1 Dec. 13, 2007

(51) Int. Cl.
*G09G 5/00* (2006.01)

(52) U.S. Cl. ............... 345/1.3; 345/1.1; 345/204

(58) Field of Classification Search ........... 345/1.1–1.3, 345/87, 204; 455/566
See application file for complete search history.

(56) References Cited

U.S. PATENT DOCUMENTS

| | | | | |
|---|---|---|---|---|
| 4,110,792 | A | 8/1978 | Long et al. ................. | 358/240 |
| 4,141,000 | A | 2/1979 | Thomas et al. ............. | 340/752 |
| 5,128,662 | A | 7/1992 | Failla ......................... | 340/752 |
| 5,379,461 | A | 1/1995 | Wilmers ..................... | 2/115 |
| 5,467,102 | A * | 11/1995 | Kuno et al. ................. | 345/1.3 |
| 5,790,371 | A * | 8/1998 | Latocha et al. ............ | 361/679.32 |
| 5,949,643 | A | 9/1999 | Batio ......................... | 361/681 |
| 5,960,442 | A | 9/1999 | Pickering ................... | 707/104 |
| 6,018,898 | A | 2/2000 | Auty et al. .................. | 40/5 |
| 6,057,814 | A | 5/2000 | Kalt ........................... | 345/58 |
| 6,076,093 | A | 6/2000 | Pickering ................... | 707/104 |
| 6,222,507 | B1 | 4/2001 | Gouko ........................ | 345/1 |
| 6,320,591 | B1 * | 11/2001 | Griencewic ................ | 345/582 |
| 6,327,482 | B1 * | 12/2001 | Miyashita .................. | 455/566 |
| 6,343,006 | B1 | 1/2002 | Moscovitch et al. ....... | 361/681 |
| 6,377,324 | B1 | 4/2002 | Katsura ...................... | 349/58 |
| 6,386,974 | B1 | 5/2002 | Adams ....................... | 463/16 |
| 6,493,002 | B1 | 12/2002 | Christensen ............... | 345/779 |
| 6,532,146 | B1 | 3/2003 | Duquette ................... | 361/681 |
| 6,628,244 | B1 | 9/2003 | Hirosawa et al. .......... | 345/2.3 |
| 6,643,124 | B1 | 11/2003 | Wilk ........................... | 361/681 |
| 6,722,976 | B2 | 4/2004 | Adams ....................... | 463/16 |
| 6,750,844 | B2 * | 6/2004 | Nakanishi .................. | 345/107 |
| 6,762,929 | B2 | 7/2004 | Sawyer ...................... | 361/681 |
| 6,771,237 | B1 | 8/2004 | Kalt ............................ | 345/85 |
| 6,807,275 | B1 * | 10/2004 | Kubo et al. ................ | 379/433.04 |
| 6,819,304 | B2 | 11/2004 | Branson .................... | 345/1.3 |
| 6,844,865 | B2 | 1/2005 | Stasko ....................... | 345/1.3 |
| 6,850,780 | B1 | 2/2005 | Gioscia et al. ............. | 455/566 |
| 6,859,219 | B1 | 2/2005 | Sall ............................ | 345/905 |
| 6,919,864 | B1 | 7/2005 | Macor ........................ | 345/1.1 |
| 6,931,265 | B2 | 8/2005 | Reyes et al. ............... | 455/566 |
| 7,091,926 | B2 | 8/2006 | Kulas ......................... | 345/1.1 |
| 7,092,247 | B2 | 8/2006 | Kim ........................... | 361/681 |
| 7,095,387 | B2 | 8/2006 | Lee et al. ................... | 345/4 |
| 7,138,962 | B2 | 11/2006 | Koenig ...................... | 345/1.3 |
| 7,196,676 | B2 | 3/2007 | Nakamura et al. ........ | 345/1.1 |
| 7,371,177 | B2 * | 5/2008 | Ellis et al. ................. | 463/42 |
| 2001/0054986 | A1 | 12/2001 | Leman ....................... | 345/1.1 |

(Continued)

*Primary Examiner*—Amare Mengistu
*Assistant Examiner*—Dmitriy Bolotin
(74) *Attorney, Agent, or Firm*—Ruth J. Ma (57) ABSTRACT

Various configurations of an electronic display, and devices incorporating the display, are provided. The display may have multiple portions connected along one or more axes, lines, points, or other connecting areas. The portions are movable about the connections. In various configurations, the display portions emulate different media and/or communication and computing devices. Two or more of the display devices may be coupled in an array.

58 Claims, 4 Drawing Sheets

U.S. PATENT DOCUMENTS

| | | | |
|---|---|---|---|
| 2002/0021622 A1 | 2/2002 | Baroche | 368/10 |
| 2002/0128055 A1 | 9/2002 | Adams | 463/6 |
| 2002/0135535 A1 | 9/2002 | Muller | 345/1.1 |
| 2002/0140628 A1 | 10/2002 | Morrone | 345/1.1 |
| 2003/0020671 A1* | 1/2003 | Santoro et al. | 345/1.3 |
| 2003/0043087 A1 | 3/2003 | Kim | 345/1.1 |
| 2003/0071800 A1* | 4/2003 | Vincent et al. | 345/204 |
| 2003/0071832 A1* | 4/2003 | Branson | 345/698 |
| 2003/0098857 A1 | 5/2003 | Gettemy et al. | 345/173 |
| 2003/0109286 A1 | 6/2003 | Hack et al. | 455/566 |
| 2003/0144034 A1 | 7/2003 | Hack et al. | 455/566 |
| 2003/0160735 A1 | 8/2003 | Lee et al. | 345/4 |
| 2003/0160754 A1* | 8/2003 | Hanson et al. | 345/156 |
| 2003/0161094 A1 | 8/2003 | Chambers | 361/681 |
| 2003/0218577 A1 | 11/2003 | Wang | 345/1.3 |
| 2003/0218712 A1 | 11/2003 | Kumar et al. | 349/155 |
| 2003/0218860 A1 | 11/2003 | Shiraiwa | 361/681 |
| 2004/0036810 A1 | 2/2004 | Kim et al. | 349/58 |
| 2004/0036818 A1 | 2/2004 | Kim et al. | 349/58 |
| 2004/0150581 A1 | 8/2004 | Westerinen et al. | 345/1.3 |
| 2004/0217423 A1 | 11/2004 | Park et al. | 257/352 |
| 2005/0050367 A1 | 3/2005 | Burger et al. | 713/202 |
| 2005/0088463 A1 | 4/2005 | Schilling | 345/699 |
| 2005/0099361 A1 | 5/2005 | Majer | 345/1.3 |
| 2005/0134524 A1 | 6/2005 | Parker et al. | 345/1.1 |
| 2005/0146845 A1 | 7/2005 | Moscovitch | 361/681 |
| 2005/0162511 A1 | 7/2005 | Jackson | 348/61 |
| 2005/0248501 A1 | 11/2005 | Kim | 345/1.1 |
| 2005/0285811 A1 | 12/2005 | Kawase et al. | 345/1.1 |
| 2006/0044215 A1 | 3/2006 | Brody et al. | 345/1.3 |
| 2006/0088359 A1 | 4/2006 | Konieczny et al. | 400/605 |
| 2006/0126284 A1 | 6/2006 | Moscovitch | 361/681 |
| 2006/0146488 A1 | 7/2006 | Kimmel | 361/681 |
| 2006/0232496 A1 | 10/2006 | Sato | 345/1.3 |
| 2007/0279315 A1* | 12/2007 | Laves et al. | 345/1.1 |

* cited by examiner

FOLDING MULTIMEDIA DISPLAY DEVICE

TECHNICAL FIELD

The present invention relates generally to display devices and, more particularly, to a flexible multimedia display device, which folds along multiple axes.

BACKGROUND

Electronic display screens provide users with the ability to access, display, edit or create text or other displayable information. Folding display devices are known in the context of laptop computers, personal data assistants, and other data processing, communication, and media devices. These devices may have a portion that moves from a closed position to an open position to allow a viewer to view the display screen. The display screens of some devices, such as some video cameras, may open along a first axis, and then be rotated about a second axis to enhance the positioning of the screen.

Flexible displays are known. One example of such a display includes a flexible and collapsible substrate on which pixels are deposited. The substrate is stored in a housing. When the substrate is extended from the housing it becomes rigid.

SUMMARY

Various embodiments of the present invention are generally directed to electronic devices having a display. The display may have multiple portions connected along one or more axes, lines, points, or other connecting areas. The portions are movable about the connections. In various configurations, the display portions emulate different media and/or communication and computing devices.

In one example embodiment an electronic display device is provided. The device includes a plurality of display portions adapted to display an electronic image. At least two of the portions share, and are movable about, a first axis.

In another example embodiment, an apparatus is provide, which includes a processor having an electronic output. The apparatus also includes a display electronically coupled to the processor to electronically display information output from the processor. The display has a plurality of display portions adapted to display an electronic image. At least two of the portions share, and are movable about, a first axis.

In another example embodiment, an electronic display device is provided. The device includes a first information source and a plurality of display portions adapted to display an electronic image. At least two of the portions share, and are movable about, a first axis. Information from the first information source is displayed on a first display window comprising at least one of the display portions.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Various embodiments of the present invention are generally directed to electronic devices having a display. The display may have multiple portions connected along one or more axes. The portions are movable about the axes. In one example, the display may have two portions connected at, and movable about a first axis. The display may also have two portions connected, and movable about a second axis. The first and second axes may or may not be parallel. In this manner, the multiple display portions may be folded about the respective axes from a closed position to an open position. As more display portions are unfolded to an open position, the overall display achieves different dimensions. Thus, the overall display may emulate differing conventional media (e.g., books, note tablets, personal data assistants, laptop computers, newspapers, and magazines) depending on which display portions are folded to an open position. In one specific illustrative example, the display may comprise six portions. These six portions may be provided as three pairs, each pair sharing a signal vertical axis. The first and second pairs may be separated by, and share, a first horizontal axis, while the second and third pairs may be separated by, and share, a second horizontal axis. In one configuration, the first pair is folded open with respect to both the vertical axis and the first horizontal axis, while the third pair (e.g., a bottom pair) remains folded over the second (e.g., middle) pair. In this configuration, the first pair of display portions collectively emulates a conventional laptop display screen. In an alternate configuration, all six pairs may be folded to an open position to create, for example, an overall display comprising a rectangle having a height greater than the width. In this configuration, the overall display might be considered to emulate a conventional newspaper.

A device incorporating the display may unfold to become any desired display or digital device, and thus may provide an efficient apparatus for communication, information, and entertainment by accessing content dependent on the desired configuration. Any number of individual devices may be combined into a single unit, which, in addition to replicating functionality, replicates form and feel, and enables the presentation of information in such a way that the information can manipulated or encountered in any number of ways, including randomly, through "thumbing." By serving as a conduit to functionality, the combined devices may be used in concert or array, increasing by many orders of magnitude the versatility of the technology. Such versatility may be adaptable to consumer, as well as to commercial, uses. The technology liberates information use to be based on its usefulness, independent of device function.

Thus, a screen may be provided, which is, in one configuration, flat and folded in sections that can be opened to replicate look and feel of information containers devices of varying sizes. These include, but are not limited to, hand-held digital devices, mass market paperback books, trade paper back or hard cover books, glossy magazines, tabloid newspapers, broadsheet newspaper, high definition television, laptop or desktop computers, cell phones, or any of the other devices discussed herein or falling within the scope and spirit of the disclosure. Folding displays include touch screen interfaces that can replicate any known keyboard, stylus screen, or touch screen, including screens and interfaces with the ability to recognize fingertip handwriting. Folding displays include access to hard-wired, wireless, satellite or other networks to receive and send media and communications, to receive programming, and to any electronically packaged information accessible to electronic or electromagnetic devices anywhere on the globe. A series of nested configurations is provided with complete digital capability to self recognize and populate the display and functionality of the desired device, media, or other displayable information.

Devices incorporating the display technology described herein may function as virtual briefcases and entertainment centers, providing a digital container usable for any application of visual information display, from text to high-definition imagery. The display screen may serve as a massively-parallel display device displaying information in a format dictated by its size. In some embodiments, each time one or more display portions are unfolded along a particular axis or vertex, the prior axis or vertex locks so as to enable to size of the display to grow and to form a continuous screen consistent with the desired display format. For example, a user seeking to view emails or prices in a handheld device format may leave the screen in its minimum surface area configuration, such that a visual display and a functional touch keyboard display are presented. Unfolding this might create a two-sided display unfolding along a central spine (or axis) in the same manner as a mass market paperback, and could be populated with the cover art and the internal pages of a mass market paperback. In addition to the digital capability to identify a starting point or resume at the most recent point of closure, a "thumbing" capability would permit paging through the contents much as a physical paper book can be paged through, such that a particular set of words or objects could be recognized and randomly encountered. Similarly, the paperback book could be unfolded along its top or bottom edge, locking the spine of the prior embodiment and presenting a larger page format analogous to a hardcover book or glossy magazine. This configuration may have a similar capability to page through, either digitally or by "thumbing," so that random content can be encountered. Similarly, the top or bottom edge can again be unfolded, to replicate a tabloid newspaper format, and again to replicate a broadsheet newspaper format, or a widescreen and/or high-definition screen (such as a television display), or a white board.

The configurations for joining portions (e.g., vertex, axis, etc) and their dimensions may be variable so that an extremely broad array of display formats may be achieved by folding or unfolding, with any modifications necessary to achieve customary ratios addressed by folding the excess content to the outside to achieve the correct proportional dimensions. Similarly, display formats having sizes that are not consistent between two portions may be achieved by folding one portion more or less than another portion.

As mentioned elsewhere in the disclosure, display portions may be joined by hinges or other mechanical devices. Alternatively, the portions may be integrated and formed from a flexible material, such as an elastic memory plastic or plastic/metal alloy. Flexible spines, for example, may permit 180-degree folds at numerous locations. A stabilization mechanism (e.g., possibly a mechanically locking mechanism or magnetism) may be incorporated to stabilize the folding display in the desired format or configuration. Similarly, electronic processors may deliver information to and from display locations, analogous to the present day pixel, while also transmitting information from each such location based on its assigned role within the desired format and functionality.

The folding display configurations may have local broadcast capability to transmit audio to headsets or to any other audio speakers or audio processors, or to any other electronic component capable of receiving an electronic signal. Secure use may be ensured through use of biometric and/or other secure access technology to control both unauthorized use of the device and to enable access to content and communications networks.

More than one device can be used in concert to provide larger display areas while maintaining functionality, including the ability to be mounted on a wall to provide a visual display analogous to a theatrical movie presentation. In this case as well, authorized use may be controlled by users and the enabling of access to third-party content may similarly be limited to authorized users. Contiguous use of neighboring devices is not necessarily limited to a single wall, but could in fact include all walls and the floor and ceiling of a room to create complete visual environments.

Different sections of the device may perform different functions simultaneously, such as providing a text messaging capability on one side or the bottom, while permitting visual display in another display portion(s).

The folding screen may be disposable, and made available on a subscription basis, such that the device itself is merely a conduit to functionality, which is owned by the users and any chosen service or content providers.

While the embodiments discussed herein may refer to electronic displays associated with specific example devices, the invention is not limited to the specific example devices. These are provided for illustrative purposes only. Also, while certain embodiments refer to a specific number of display portions, the teaching of the invention may be applied to any display having any number of portions. Further, while certain embodiments and figures illustrate display portions as squares or rectangles, the teaching of the invention may be applied to display portions having alternative geometric shapes.

According one example embodiment, as illustrated in FIG. 1, a display 10 is provided. Preferably, display 10 is an electronic display for displaying electronic information. However, the teachings of various embodiments may be applied to non-electronic displays. Electronic displays may include, without limitation, displays for computers (e.g., desktop or laptop computers), mobile communication devices, phones, personal data assistants (PDAs), televisions, electronic media device (e.g., electronic books, note tablets, etc.), electronic billboards and other advertising devices, televisions, and video recording and display devices. Display 10 is preferably capable of displaying images of any type of electronic information and in various formats including, without limitation, text, images, video, applications, spreadsheets, etc. Sources for the information displayed on display 10 may include any available electronic source including computer applications, stored information, and information transmitted from electronic communication devices and systems (such as, for example, the Internet). For illustrative purposes only, various information that might be displayed include graphical user interfaces for computer applications, financial transaction and trading information, news (including news, weather, sports, etc.), advertisements, literature (e.g., books, magazines, newspapers, periodicals), chat room and instant messaging information, photographs and other images, video (in any electronic format), etc.

Generally, display 10 may have multiple display portions. Selected ones of the display portions may be coupled, joined at, or otherwise share, an axis. The display portions are generally moveable about the respective axes so that the configuration of the overall display (e.g., a display comprising multiple portions) may be changed. For example, the configuration may be changed from a completely open state, to a first partially open state, to a second partially open state (with a perimeter that is geometrically different from the perimeter associated with the first open state), to a completely closed state. In the completely open state, for example, the display portions may be coplanar. In the completely closed state, the display portions may be disposed in discrete, but parallel, planes and may overlap one another. The display portions may be joined by a joining device, such as a hinge. Alternatively, the display portions may be integral, and the axis of movement may simply be a line along the display material about which the portions are moved. This might be the case, for instance, when a flexible screen material is used for the display. The flexibility of the display to conform to different configurations allows, among other things, the use of the display to emulate different types of media. For example, in one configuration, the display might emulate a laptop computer screen. In another configuration, the display might emulate a PDA screen. In still another configuration the display might emulate a book or a newspaper.

The display may be electronically coupled (e.g., wireless, hard-wired, USB connection, etc.) to a data source (e.g., a computer processor, an Internet server, or a data storage device). Information transmitted to the display may be displayed on one or more of the portions. For example, an image corresponding to the data may be displayed on one of the display portions, on each of two display portions, or across two (or more) display portions. Also one source of information might be displayed on one or more portions, while a different source of information is displayed on a different one or more display portions.

In certain embodiments, the source(s) and/or types of information viewable on the display or portions thereof is dependent upon the configuration of the display and/or its display portions. Thus, as an example, if a display having six portions was fully opened and, for example, emulated a newspaper, then the source of information provided to the display might be the New York Times. However, if the display was only partially open so that two of the display portions were viewable, then the source of information might be the graphical user interface of a PDA software program. The type of information displayed may automatically shift from one to another depending on the configuration of the display. Alternatively, the shift may require a user action, such as the press of a button, or the activation of one or more keystrokes.

As a further example of flexibility, the displayed information may be adaptable to the configuration of the display in other ways. For instance, if the display is only partially open such that two of six display portions are viewable, then an image might be displayed using the two portions. In other words the image (photo, text, GUI, etc.) would fill the combined two display portions. Then, if a user completely opened the display so that all six display portions were viewable, the image might be automatically enlarged to fill all six display portions. Alternatively, an image might fill only a certain number of the display portions, even if more of the display portions are open and/or viewable.

Figure 1A:
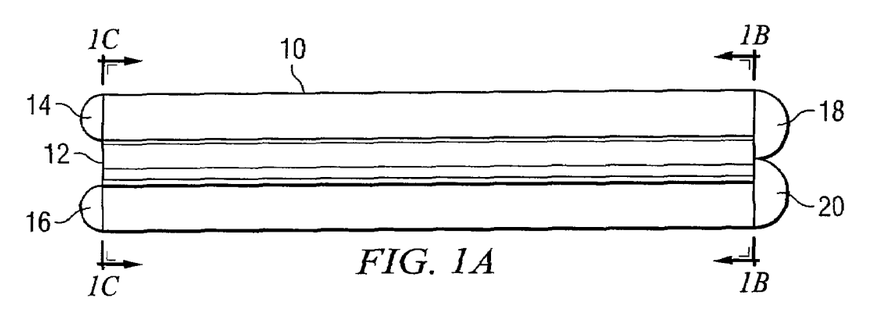
FIGS. 1A-1D illustrate side portions of a display device in accordance with an embodiment of the present invention.
Figure 1B:
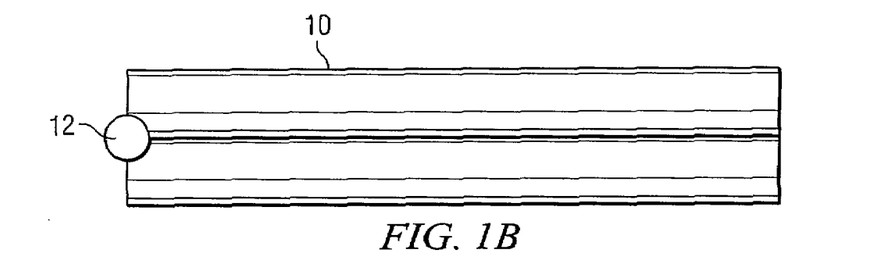
Figure 1C:
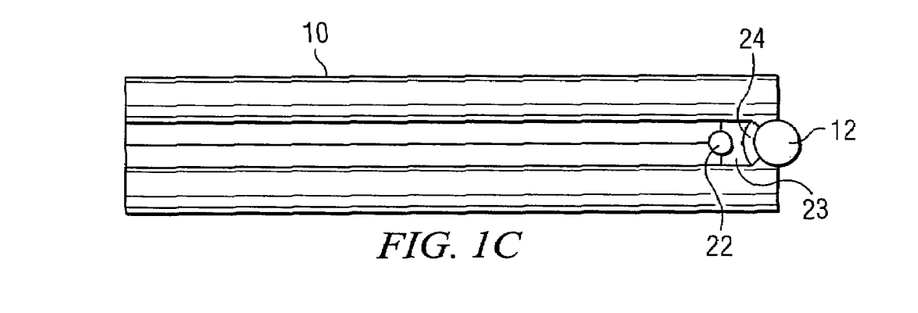
Figure 1D:
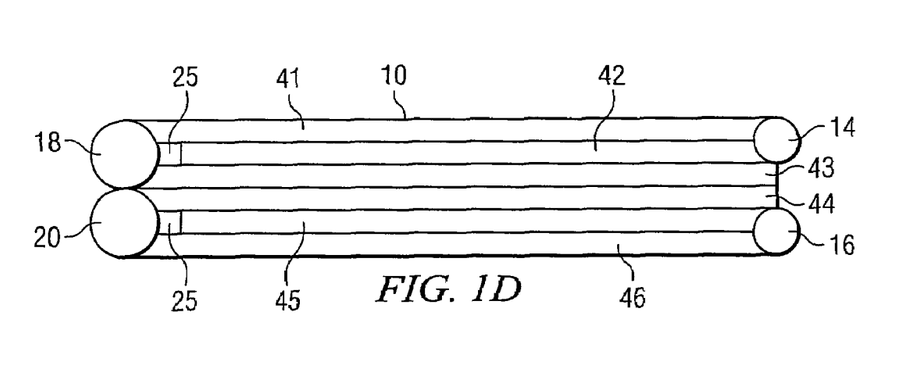
Figure 2:
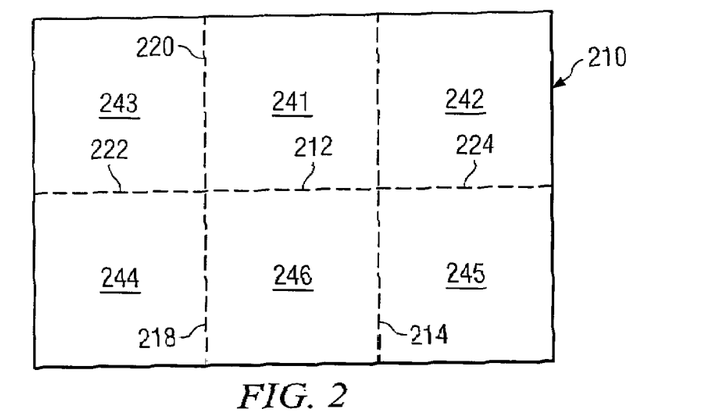
FIG. 2 illustrates a fully-open plan view of a display device in accordance with an embodiment of the present invention.

Returning to FIG. 1, display 10 is depicted from different side views A, B, C, and D. View A is a rear view. View B is a side view shown from the perspective of arrows B-B in view A. View C is a side view (opposite view B) shown from the perspective of arrows C-C in view A. And, view D is a front view (opposite view A). Display 10 comprises six display portions 41, 42, 43, 44, 45, and 46. While this particular embodiment incorporates six display portions, the invention is not so limited. Any number of display portions may be used so long as there are a plurality of display portions. When display 10 is in a completely closed state, for example, the display portions 41-46 are disposed in discrete, parallel planes. It should also be noted that the depiction in FIG. 1 is an example only and the dimensions and particular configuration of display 10 are merely examples. For instance, the thickness of various portions of display 10 may be modified as appropriate or as desired. As can be seen the display portions also overlap one another. Although the display portions are shown to substantially overlap one another, so that viewed from the top they appear to share a perimeter, the invention is not so limited. The overlap may be partial so that, viewed from the top, a part of one portion may extend outwardly from the perimeter of another portion. It should also be noted that the display portions are shown folded to a closed position such that the display portions are overlapping, or stacked, in a particular order. The illustrated order may be varied, however, depending upon the how the display portions are coupled to each other. Also, the display portions may be rectangular (as shown in FIG. 2, for example), they may comprise other shapes, such as squares or rectangles. Any shape may be used for the portions as long as there is a sufficient common edge between at least two of the display portions so that the two portions may be moved, or folded, about the common axis.

In the illustrated embodiment, first portion 41 is coupled with second portion 42 at axis 14, and with third portion 43 at axis 18. It should be noted that any respective axis may comprise a hinge or other mechanical joining device. Alternatively, an axis may comprise a portion of a flexible display material which serves as a joining line between the two respective portions and about which the two portions may move. Sixth portion 46 is coupled to fifth portion 45 at axis 16, and to fourth portion 44 at axis 20. First portion 41 and sixth portion 46 are coupled at axis 12. Third portion 43 and fourth portion 44 are coupled at axis 22. Second portion 42 and fifth portion 45 are coupled. First portion 41 is coupled to third portion 43 at axis 24. In the case of hinged axes, it may be helpful to have hinges extending only partially along given axes and have the display portions separated from one another near the ends of the axes. This will avoid interference between the ends of two hinges. This may be less of a concern with respect to displays incorporating a flexible display material. Also, it is preferable to have gaps, such as gaps 25 and gap 23, to accommodate the space taken by the joining devices. Thus, the respective display portions might not have precisely the same dimensions. The size and positioning of joining devices may be varied to accommodate different numbers of display portions, as well as different schemes for the folding and interleaving of display portions in different positions (such as in the closed position).

In the embodiment illustrated in FIG. 2, a user may first move the set of portions 41, 42, 43 relative to the set of portions 44, 45, 46. This may be accomplished by moving the respective sets about axes 12, 22 and 24. The user may then move portions 43 and 44 relative to the remaining portions. This movement is about axes 18 and 20. The user may then move 44 and 45 relative to the remaining portions by moving portions 44 and 45 about axes 14 and 16. Thus, the display portions may be rotated about the respective axes to a fully-open position, such as that shown for display 210 in FIG. 2. In the fully-open position, it may be appreciated that at least one of the respective axes is not parallel with at least one other axis. Thus, there are at least two axes which are angularly offset from one another. For example, in the fully-open position axis 18 would be perpendicular to axis 22. It can also be appreciated that in the closed, or partially open, position, two axes which are parallel in the fully-open position may become angularly offset from one another. For example, in the fully-open position axes 18 and 20 are parallel (and coincidental), while in a partially open position, axes 18 and 20 are angularly offset. In a fully-closed position, axes 18 and 20 become parallel once again, but are no longer coincidental.

It will be appreciated that the movement of portions about axes is different for different display configurations. Depending on the configuration, a given display portion may be moveable about the axis for 360 degrees, or the range of movement may be limited to something less than 360 degrees.

In the embodiment illustrated in FIG. 2, a given display portion may only display information on one side. That is, a given portion only has a display screen with pixels on one side. In alternative embodiment, however, a display portion may have a display screen or display pixels on both sides. For example, it may be desirable for first portion 41 to have display pixels on both sides. Thus, when the display 10 is in the fully open position, a first side of portion 41 (together with the other portions 42-45) may provide a display screen. In the fully-closed position however, the first side of portion 41 will not be viewable. Thus, if additional display pixels are provided on a second side (i.e., the opposing side) of portion 41, they may be viewable when display 10 is in the fully-closed position. Therefore, a fully-open display 10 might serve as a computer screen, while a fully-closed display 10 might serve as a PDA screen (via second side of portion 41).

As mentioned, the display screen may incorporate conventional display screen materials as are found, for example, in laptop computers. Alternatively, a flexible material may be used. In one embodiment, organic light emitting diodes (OLEDs) are used. The OLEDs are disposed on a substrate, which, as noted, may be flexible or rigid. Flexible substrates include plastics, foils and other materials. Any suitable material may be used that provides the desired rigidity or flexibility. Also, while OLEDs are used to produce the images, in other embodiments, the images may be produced by any suitable display technology depending upon the desired optical properties. Certain suitable materials for display screens are described in Published U.S. Patent Application No. 2003/0144034, which is hereby incorporated by reference.

As previously discussed, the display portions 41-46 may be moved to provide different configurations of display 10. Thus, display 10 may emulate the display of different types of devices depending upon the relative positions of portions 41-46. Therefore, depending on the desired configuration, display 10 may emulate any suitable device which uses or incorporates a display such as, without limitation, computers (e.g., desktop or laptop computers), mobile communication devices, phones, personal data assistants (PDAs), televisions, electronic media device (e.g., electronic books, note tablets, etc.), electronic billboards and other advertising devices, televisions, and video recording and display devices.

FIG. 2 illustrates a fully-opened display 210. As can be seen display 210 comprises six display portions 241, 242, 243, 244, 245, and 246. Portion 241 is coupled with portion 243 at axis 220, with portion 242 at axis 216, and with portion 246 at axis 212. Portion 243 is also coupled with portion 244 at axis 222. Portion 242 is also coupled with portion 245 at axis 224. Portion 246 is also coupled with portion 244 at axis 218 and with portion 245 at axis 214.

Figure 3:
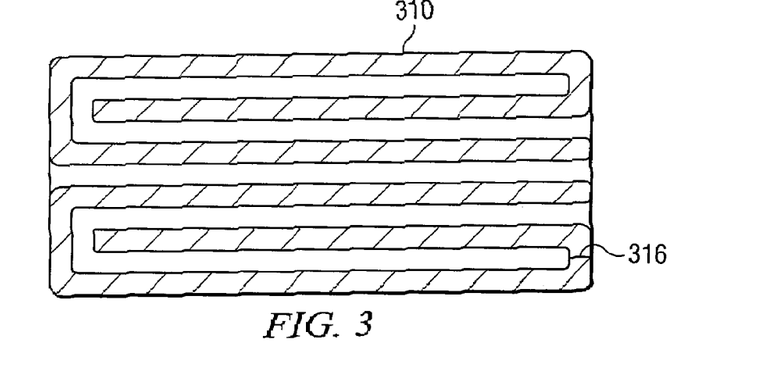
FIG. 3 illustrates a side view of a display device in accordance with an embodiment of the present invention.

FIG. 3 illustrates a display 310 incorporating flexible display materials. As can be seen, there are no mechanical joining devices to couple the respective display portions. Rather, a pair of display portions is joined at a coupling portion of the flexible material which provides a spine, or joining line, such as spine 316. Spine 316 may comprise a memory line, so that repeated movements of the two respective portions about the shared axis always occur about the same spine.

Figure 4:
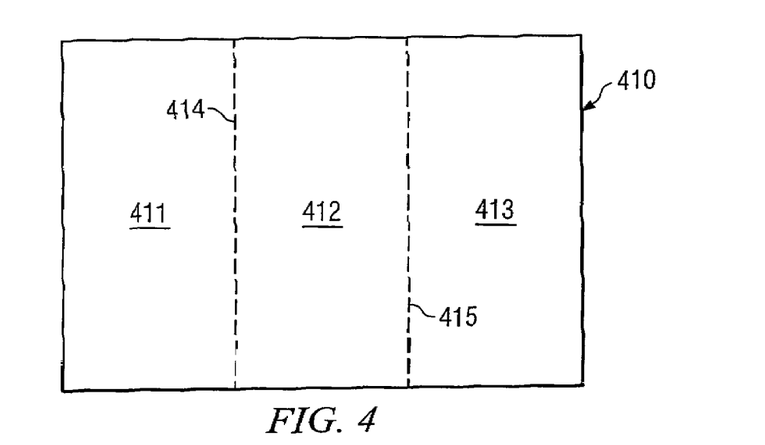
FIG. 4 illustrates a plan view of a display device in accordance with an embodiment of the present invention.

FIGS. 4-10 illustrate various other configurations of multi-portion displays. FIG. 4 illustrates a display 410 which may have substantially the same overall dimensions as display 210, for example. However, display 10 comprises only three portions coupled at two axes. First and second portions 411, 412 are coupled at axis 414. Second and third portions 412, 413 are coupled at axis 415.

Figure 5:
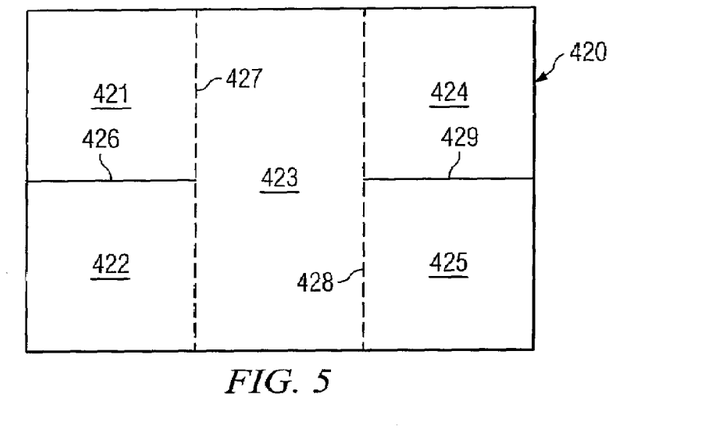
FIG. 5 illustrates a plan view of a display device in accordance with an embodiment of the present invention.

FIG. 5 illustrates a display 420 having five portions coupled at two axes. Third portion 423 is coupled to both first and second portions 421, 422 at first axis 427. Third portion 423 is also coupled to both fourth and fifth portions 424, 425 at second axis 428. Line 426 represents separation between first and second portions 421, 422. Line 424 represents separation between fourth and fifth portions 424, 425. Thus, for example, first and second portions 421, 422 are both moveable about axis 427. However, the movement of first portion 421 is independent of the movement of second portion 422. Fourth and fifth portions 424, 425 are similar with respect to independence of movement. First and second axes 427, 428 are parallel.

Figure 6:
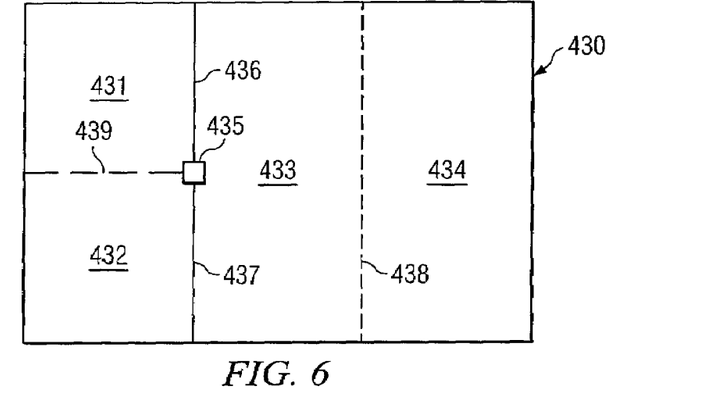
FIG. 6 illustrates a plan view of a display device in accordance with an embodiment of the present invention.

FIG. 6 illustrates a display 430 having four display portions coupled at two axes and a connection joint. First and second portions 431, 432 are coupled at axis 439. First and second portions 431, 432 are coupled with third portion 433 at connection joint 435. Third and fourth portions 433, 434 are coupled at axis 438. Line 436 represents separation between first and third portions 431, 433. Line 437 represents separation between second portion 432 and third portion 433. It is preferable that joint or intersection 435 is a universal joint, or other connection suitable for interconnecting first, second, and third portions 431, 432, and 433 while allowing certain movement of the respect portions. For instance, first and second portions 431, 432 are moveable about axis 439 and are also movable about an axis defined by one or both of separation lines 436 and 437.

Figure 7:
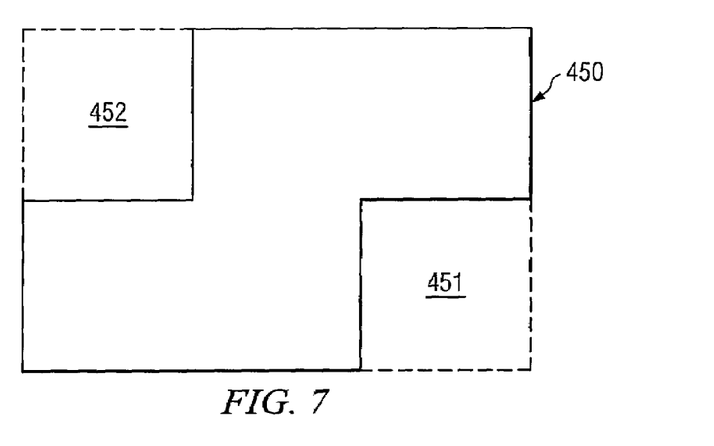
FIG. 7 illustrates a plan view of a display device in accordance with an embodiment of the present invention.

FIG. 7 illustrates a display 450 in a partially open state. Display 450 may be configured similarly to display 420, for example. Respective display portions that would otherwise occupy spaces 451, and 452 are folded about their respective coupling axes so that the illustrated display surface results.

Figure 8:
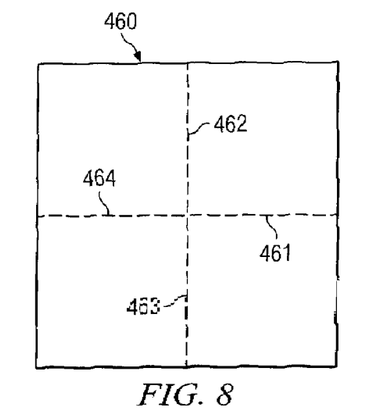
FIG. 8 illustrates a plan view of a display device in accordance with an embodiment of the present invention.

FIG. 8 illustrates a display 460 having 4 display portions moveable about two four axes. Each of the four portions is moveable about two different axes, which are perpendicular in the open state.

Figure 9:
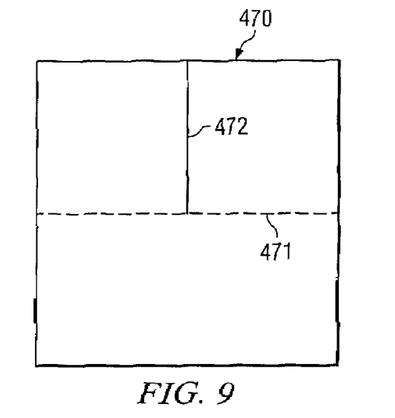
FIG. 9 illustrates a plan view of a display device in accordance with an embodiment of the present invention.

FIG. 9 illustrates a display 470 having three portions moveable about one axis 471. Two portions are separated by a separation line 472 or boundary, such that all three portions are independently moveable about axis 471.

Figure 10:
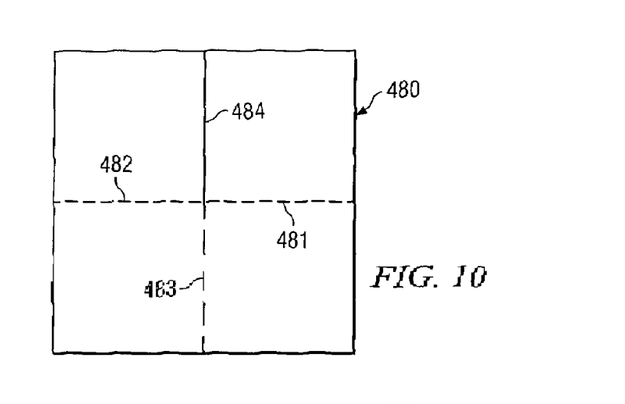
FIG. 10 illustrates a plan view of a display device in accordance with an embodiment of the present invention.

FIG. 10 illustrates a display 480 having four portions coupled at three axes. Two portions are coupled at axis 481. Two other portions are coupled at axis 482. Two portions are coupled at axis 483 Line 484 represents a line of separation between two portions. Respective portions are foldable about axes 481 and 482. The combined portions foldable about these axes are then foldable about axis 483.

Figure 11:
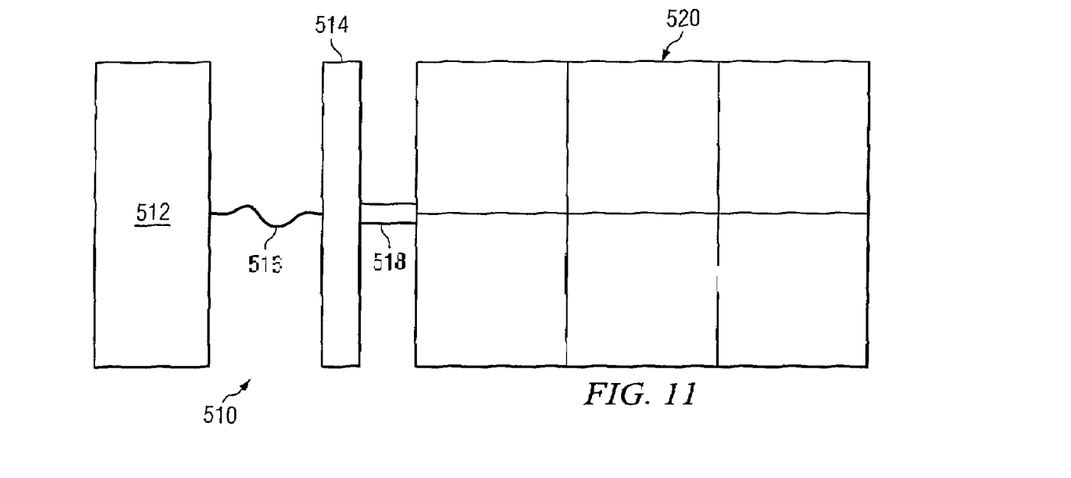
FIG. 11 illustrates a block diagram of an apparatus having a display in accordance with an embodiment of the present invention.

FIG. 11 illustrates an example embodiment of an apparatus utilizing a multiple-portion display. The multi-portion display may be any of the displays described herein, or falling within the scope and spirit of the disclosure. Apparatus 510 comprises a processor 512 and a multi-portion display 520. Display 520 may be connected, via connector 518 to a display housing or docking station 514. Unit 514 may be connected, via connector 516 to processor 512. Processor 512 provides information to be displayed on display 520.

It should be understood that this apparatus is an example only and myriad other configurations may be provided. For example, the processor may be directly connected to the display. Alternatively, the processor may be embedded, or otherwise incorporated into the display itself. The processor may cooperate with, or be replaced by a data storage device. Any type of processor and/or memory device may be used. Any number of processors and/or data storage devices may be coupled to the display and any number of displays may be coupled to the processor(s) and/or data storage unit(s). Any of the connections may be wired or wireless. Any suitable communication protocol(s) may be used to provide the transfer of information between the various elements. Unit 514 may have any number of configurations. It may be a conventional docking station. However, it may also, or alternatively, serve as a housing for the display. The display may be disposed entirely or partially within unit 514. For example, unit 514 may serve as a housing after the display is folded into a closed position. In the case of a flexible display, the display may be rolled into unit 514 in a scroll-type fashion.

As noted, the display device(s) described herein may, in certain embodiments, be incorporated into a variety of electronic devices such as PDAs, mobile telephones, televisions, computers, digital music players, etc. In such embodiments, other features and elements may also be incorporated. For example, other elements may include, without limitation, elements to assist a user of the device in creating, generating, or controlling display characteristics or the information shown on the display. These elements may include, without limitation, keyboards, track wheels, pointers, buttons, levers, a stylus, etc. These elements may be included singularly or in multiples, and in any suitable combination. An information controlling element such as one of these may be provided with the device in a first configuration of the display screen to control displayer information. Preferably, the control element may also control displayed information in a second screen configuration. It should be noted that these various control elements are optional variations and are not required.

Other alternative configurations will be understood and appreciated, by those of ordinary skill in the art, as falling within the scope and spirit of this disclosure.

The invention claimed is:

1. An apparatus, comprising:
   a processor having an electronic output;
   a display that is configurable into a plurality of configurations and is electronically coupled to receive information from the processor, in which the display comprises a plurality of portions adapted to display an electronic image, and in which at least two of the portions share a first axis and are movable about the first axis; and
   a memory, in which the memory stores instructions which, when executed by the processor, direct the processor to:
   receive a first indication that the display has been configured into a first configuration;
   determine that the first configuration corresponds to a first device;
   display, on at least one of the plurality of portions of the display, a first content relating to the first device, in which the act of displaying is in response to the processor determining that the display has been configured into the first device;
   receive a second indication that the display has been configured into a second configuration, in which the second configuration is different from the first configuration;
   determine that the second configuration corresponds to a second device; and
   display, on at least one of the plurality of portions of the display, a second content relating to the second device, in which the second content differs from the first content, and in which the act of displaying is in response to the processor determining that the display has been configured into the second device.

2. The apparatus of claim 1, in which at least two portions share and are movable about a second axis.

3. The apparatus of claim 2, in which the first axis is parallel to the second axis.

4. The apparatus of claim 2, in which the first axis is perpendicular to the second axis.

5. The apparatus of claim 2, in which the first axis is angularly offset from the second axis.

6. The apparatus of claim 2 in which at least one of the at least two portions sharing the first axis is the same as one of the at least two portions sharing the second axis.

7. The apparatus of claim 2, in which at least one of the portions sharing the second axis comprises at least a part of one of the portions sharing the first axis.

8. The apparatus of claim 1, in which at least one of the portions sharing the first axis comprises at least two parts independently movable about the first axis.

9. The apparatus of claim 1, in which the plurality of portions are foldable about their respective axes to form a folded unit having a perimeter substantially equivalent to a perimeter of one of the portions.

10. The apparatus of claim 1, in which the plurality of portions comprises at least four portions.

11. The apparatus of claim 1, in which the plurality of portions comprises at least six portions.

12. The apparatus of claim 2, in which the plurality of portions are foldable about their respective axes to a state in which at least one portion sharing the second axis is at least partially disposed between two of the portions sharing the first axis.

13. The apparatus of claim 1, in which at least one of the axes comprises a hinge.

14. The apparatus of claim 1, in which at least one of the axes comprises a spine within a flexible material, the spine having a memory characteristic.

15. The apparatus of claim 1, in which the first device and the second device comprises at least one of a personal data assistant, a mobile communication device, a paper media unit, a book, a newspaper, a magazine, an electronic note tablet, a computer, a video recording device and a video display device.

16. The apparatus of claim 1, in which the processor is adapted to transmit information to at least two information sources, in which one of the at least two information sources corresponds to a first portion from the plurality of portions and a second of the at least two information sources corresponds to a second portion from the plurality of portions.

17. The apparatus of claim 1, further comprising:
a display connection unit, in which the display connection unit is coupled electronically to the processor and the display.

18. The apparatus of claim 1, further comprising:
a display housing that is adapted to house the display in a closed state.

19. The apparatus of claim 1, further comprising:
a wireless device that is coupled to the processor, in which the wireless device transmits information wirelessly to the display.

20. The apparatus of claim 1, further comprising:
a wireless receiver that is coupled to the display, in which the wireless receiver receives information that is sent wirelessly to the display.

21. The apparatus of claim 1, in which the processor is adapted to receive information from a first information source, in which information from the first information source is displayed on a first portion of the display.

22. The apparatus of claim 21, in which the processor is adapted to receive information from a second information source, in which information from the second information source is displayed on a second portion of the display, in which the second portion is different from the first portion.

23. The apparatus of claim 1, in which the memory further stores instructions which, when executed by the processor, direct the processor to:
change the first content relating to the first device to the second content relating to the second device, in response to the processor determining that the display has been changed from the first configuration into the second configuration.

24. The apparatus of claim 23, in which the act of changing from the first content to the second content is performed automatically.

25. The apparatus of claim 21, further comprising:
a control device for controlling the information being transmitted from the first information source.

26. The apparatus of claim 25, in which the control device is operable to move a cursor from a first position to a second position.

27. The apparatus of claim 25, in which the control device is operable to change a position of the information on the display.

28. The apparatus of claim 25, in which the control device is operable to move an electronic image from a first portion to a second portion of the display.

29. The apparatus of claim 1, further comprising:
transmitting an indication to an information source that the display has been configured into a first device; and
receiving information relating to the first device from the information source.

30. A storage medium, comprising:
a display that is configurable into a plurality of configurations and is electronically coupled to receive information from a processor, in which the display comprises a plurality of portions adapted to display an electronic image, and in which at least two of the portions share a first axis and are movable about the first axis; and
a storage medium, in which the storage medium stores instructions which, when executed by the processor, direct the processor to:
receive a first indication that the display has been configured into a first configuration;
determine that the first configuration corresponds to a first device;
display, on at least one of the plurality of portions of the display, a first content relating to the first device, in which the act of displaying is in response to the processor determining that the display has been configured into the first device;
receive a second indication that the display has been configured into a second configuration, in which the second configuration is different from the first configuration;
determine that the second configuration corresponds to a second device; and
display, on at least one of the plurality of portions of the display, a second content relating to the second device, in which the second content differs from the first content, and in which the act of displaying is in response to the processor determining that the display has been configured into the second device.

31. The storage medium of claim 30, in which at least two portions share and are movable about a second axis.

32. The storage medium of claim 31, in which the first axis is parallel to the second axis.

33. The storage medium of claim 31, in which the first axis is perpendicular to the second axis.

34. The storage medium of claim 31, in which the first axis is angularly offset from the second axis.

35. The storage medium of claim 31 in which at least one of the at least two portions sharing the first axis is the same as one of the at least two portions sharing the second axis.

36. The storage medium of claim 31, in which at least one of the portions sharing the second axis comprises at least a part of one of the portions sharing the first axis.

37. The storage medium of claim 30, in which at least one of the portions sharing the first axis comprises at least two parts independently movable about the first axis.

38. The storage medium of claim 30, in which the plurality of portions are foldable about their respective axes to form a folded unit having a perimeter substantially equivalent to a perimeter of one of the portions.

39. The storage medium of claim 30, in which the plurality of portions comprises at least four portions.

40. The storage medium of claim 30, in which the plurality of portions comprises at least six portions.

41. The storage medium of claim 31, in which the plurality of portions are foldable about their respective axes to a state in which at least one portion sharing the second axis is at least partially disposed between two of the portions sharing the first axis.

42. The storage medium of claim 30, in which at least one of the axes comprises a hinge.

43. The storage medium of claim 30, in which at least one of the axes comprises a spine within a flexible material, the spine having a memory characteristic.

44. The storage medium of claim 30, in which the first device and the second device comprises at least one of a personal data assistant, a mobile communication device, a paper media unit, a book, a newspaper, a magazine, an electronic note tablet, a computer, a video recording device and a video display device.

45. The storage medium of claim 30, in which the processor is adapted to transmit information to at least two information sources, in which one of the at least two information sources corresponds to a first portion from the plurality of portions and a second of the at least two information sources corresponds to a second portion from the plurality of portions.

46. The storage medium of claim 30, further comprising:
a display connection unit, in which the display connection unit is coupled electronically to the processor and the display.

47. The storage medium of claim 30, further comprising:
a display housing that is adapted to house the display in a closed state.

48. The storage medium of claim 30, further comprising:
a wireless device that is coupled to the processor, in which the wireless device transmits information wirelessly to the display.

49. The storage medium of claim 30, further comprising:
a wireless receiver that is coupled to the display, in which the wireless receiver receives information that is sent wirelessly to the display.

50. The storage medium of claim 30, in which the processor is adapted to receive information from a first information source, in which information from the first information source is displayed on a first portion of the display.

51. The storage medium of claim 50, in which the processor is adapted to receive information from a second information source, in which information from the second information source is displayed on a second portion of the display, in which the second portion is different from the first portion.

52. The storage medium of claim 30, in which the memory further stores instructions which, when executed by the processor, direct the processor to:
change the first content relating to the first device to the second content relating to the second device, in response to the processor determining that the display has been changed from the first configuration into the second configuration.

53. The storage medium of claim 52, in which the act of changing from the first content to the second content is performed automatically.

54. The storage medium of claim 50, further comprising:
a control device for controlling the information being transmitted from the first information source.

55. The storage medium of claim 54, in which the control device is operable to move a cursor from a first position to a second position.

56. The storage medium of claim 54, in which the control device is operable to change a position of the information on the display.

57. The storage medium of claim 54, in which the control device is operable to move an electronic image from a first portion to a second portion of the display.

58. The storage medium of claim 30, further comprising:
transmitting an indication to an information source that the display has been configured into a first device; and
receiving information relating to the first device from the information source.

* * * * *